Jan. 24, 1950     E. E. DYSON ET AL     2,495,318
RETHREADER
Filed Nov. 10, 1944
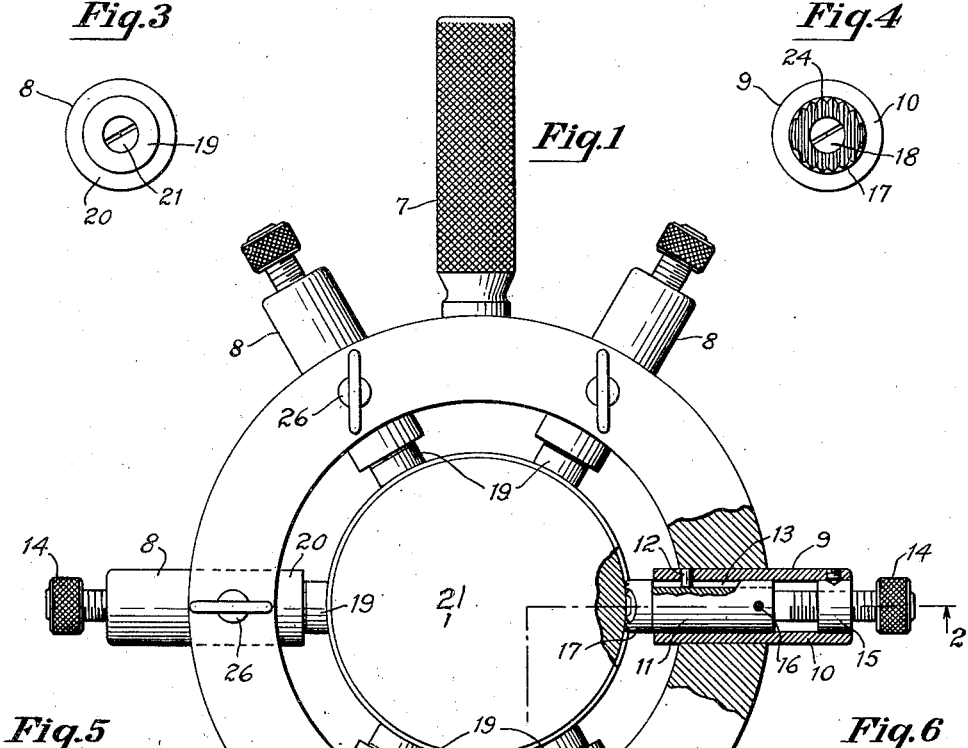
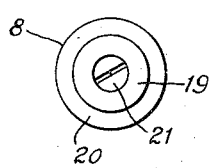
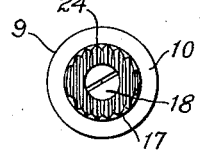
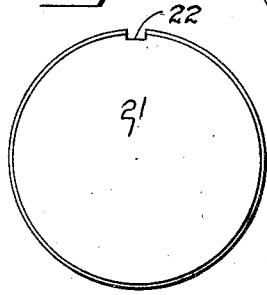
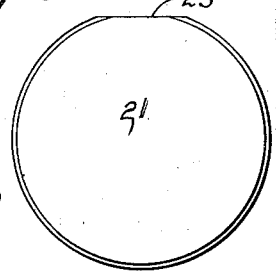
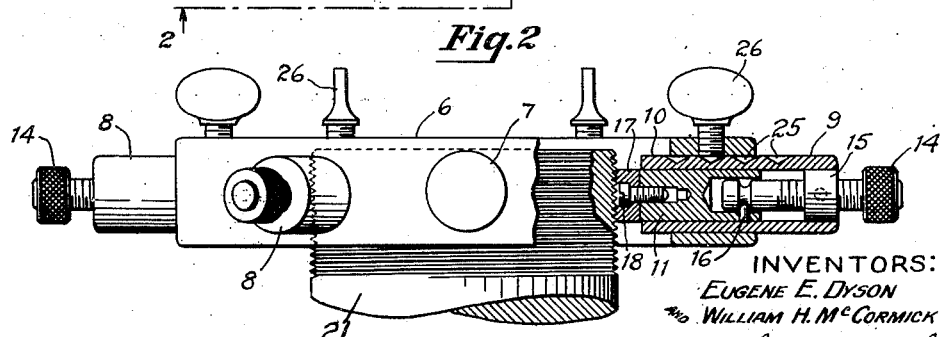
INVENTORS:
EUGENE E. DYSON
AND WILLIAM H. McCORMICK
BY Arthur B. Jenkins
ATTORNEY.

Patented Jan. 24, 1950

2,495,318

UNITED STATES PATENT OFFICE 2,495,318

RETHREADER

Eugene E. Dyson and William H. McCormick, New Britain, Conn.

Application November 10, 1944, Serial No. 562,862

2 Claims. (Cl. 10—121)

Our invention relates to the class of devices which are employed for repairing a mutilated thread as on a shaft or axle of considerable size particularly as found in heavy duty vehicles largely employed at the present time, and an object of our invention, among others, is the production of a device by the use of which such mutilated threads may be readily repaired and restored to usable conditions.

One form of a device embodying our invention and in the construction and use of which the objects herein set out, as well as others, may be attained is illustrated in the accompanying drawing, in which:

Figure 1 is a face view of our improved rethreading tool with parts broken away and shown in section.

Figure 2 is an edge view of the same partly in section.

Figure 3 is an end view of one of the steadying units.

Figure 4 is an end view of a rethreading unit.

Figures 5 and 6 are enlarged end views in cross section showing the nature of shafts requiring to be rethreaded.

In the accompanying drawings the numeral 6 denotes the body of our rethreading tool which is in the form of a ring of substantial thickness and width to sustain the threading and supporting units which are employed in thread reforming operations. This tool or instrument is for manual operation which is required in the rethreading of devices for which the instrument is made, the reforming of the threads on such devices requiring care and close attention. Handles 7 are secured to and project from the edge of the body preferably on diametrically opposite sides.

Riders or steadying units 8 are supported in the body preferably at equal distances apart, five being shown in the drawing herein, and a threading unit 9 is also supported in the body preferably at an equal distance from and between two of the steadying units, as shown in Fig. 1. The threading unit 9 is located preferably midway between the handles, although this is not absolutely essential but goes to make up a balanced structure.

The threading unit 9 comprises a sleeve support 10 that is fitted into and extends through the body, as shown in Fig. 1. A die holder 11 is located in the support 10 and is adjustably movable lengthwise therein, being held against rotating movement by means of a key 12 extending through the holder into a key groove 13 in the holder. A feed screw 14 is threaded through a feed screw support 15 fastened in the end of the sleeve support 10, the feed screw having an annular groove at its inner end engaged by a retaining pin 16 extending through the holder 11 into said groove, as shown in Fig. 2.

A thread cutting die 17 is secured to the end of the holder 11 as by means of a die retaining screw 18 as shown in Fig. 4.

The riders or steadying units 8 are of substantially the same construction as that just described with respect to the threading die, as to the supports, adjustable features, etc. A rider 19 is secured to the end of each of the rider supports 20 as by means of a retaining screw 21 as shown in Fig. 3.

These riders 19 are composed of a metal or substance which is comparatively soft so that it will not mutilate a thread which is formed on the threaded device being operated upon.

It will be noted that our improved rethreading tool includes a plurality of circumferentially spaced supports, such as the riders 19, and the threading dies, such as the die 17, of which there are preferably five supports and one threading die that are evenly spaced, circumferentially, so that the said supports will engage the threaded surface and support the threading die in its position with relation to the surface of the member being threaded.

In use, our rethreading tool is first placed over the threaded portion of the member to be rethreaded, and the threading die 17 is moved into engagement with a good portion of the thread on said member. The riders 19 are then adjusted by being brought into contact with the threaded surface and, if necessary, the threading die 17 may be further adjusted for proper engagement with the thread.

Since the riders 19 are constructed of a soft metal which will not damage the threads, they may be forced into engagement with the threads, by means of the screws 14, so that the said threads will bite into the riders and thereby provide threads on the said riders in engagement with the threads on the member which will permit the tool to be carried along the threaded portion of the member with the rethreading die always supported in its adjusted position relatively to the said thread regardless of whether it is in contact with the thread or passing over a slot, such as 22, or a flat surface, such as 23.

Rotation of the tool upon the threaded portion will thus carry the threading die 17 through the good portion of the thread and across the damaged portion thereof, rethreading said damaged portion.

It will therefore be understood that my invention provides a plurality of supporting members which are so spaced around the circumference of a threaded member that they will extend over more than 180 degrees of said circumference and thereby support the threading die, as well as any of the riders, in adjusted position and carry it across open spaces in the threaded surface without disturbing the adjustment of said die or rider relatively to the thread, or of said tool upon the member.

Each of the sleeve supports 10 for both the rider and threading units has positioning cavities 25 for the reception of the inner ends of positioning thumb screws 26, these being for the placing of the units in such positions as may be desired, the final adjustments of the die and riders being by means of the feed screws 14.

We claim:

1. A rethreading tool comprising a body having an opening therein adapted to receive a member to be threaded, a single rethreading die extending radially from said body into said opening for the purpose of rethreading a mutilated thread on said member, and a plurality of radial supports carried by said body and formed of relatively soft metal adapted to engage the surface of said member and having the threads of said member cut threads therein and carry the said rethreading die in adjusted position relatively to the thread on said member.

2. A rethreading tool of the character described in the form of a body with an opening therein adapted to receive a member to be rethreaded, a rethreading die extending into said opening and adapted to be adjusted into engagement with said thread, a plurality of supporting members extending into said opening and radially spaced about the axis of said member over a major portion of the circumferential distance thereof; the said carrying members being constructed of a soft material to thereby prevent damage to the threads of said member and have threads formed therein for carrying the said rethreading die through said thread and across open spaces therein.

WILLIAM H. McCORMICK.
EUGENE E. DYSON.

REFERENCES CITED

The following references are of record in the file of this patent:

UNITED STATES PATENTS

| Number | Name | Date |
|---|---|---|
| 546,573 | Bartholomew | Sept. 17, 1895 |
| 588,056 | Echols | Aug. 10, 1897 |
| 1,393,156 | Nonneman | Oct. 11, 1921 |
| 1,462,895 | Amundson | July 24, 1923 |
| 1,506,027 | O'Brien | Aug. 26, 1924 |
| 1,545,162 | Nelson | July 7, 1925 |
| 1,616,649 | Borden | Feb. 8, 1927 |
| 1,657,086 | Hyrup | Jan. 24, 1928 |
| 1,973,231 | Thewes | Sept. 11, 1934 |
| 2,052,587 | Tucker | Sept. 1, 1936 |
| 2,244,138 | Brown | June 3, 1941 |

FOREIGN PATENTS

| Number | Country | Date |
|---|---|---|
| 27,341 | Germany | June 3, 1884 |
| 119,748 | Germany | May 1, 1901 |